Patented Sept. 6, 1949

2,480,935

UNITED STATES PATENT OFFICE 2,480,935

CHOCOLATE PRODUCTS

Norman W. Kempf, Auburndale, Mass., and Harold H. Hoben, River Forest, Ill., assignors, by mesne assignments, of fifty per cent to General Foods Corporation, New York, N. Y., a corporation of Delaware No Drawing. Application August 9, 1945, Serial No. 609,936

9 Claims. (Cl. 99—23)

This invention relates to the production of edible solidified chocolate adapted for distribution to the consumer under conditions of severe heat, such as may be met during the heat of the summer or substantially at all times in the tropics.

Solidified chocolate, such as commonly used for coatings and other chocolate products, when subjected to temperatures above the melting point of the cocoa butter or other fat constituents, as in hot weather or in the tropics, tends to lose its desired character and shape, to become soft and unsatisfactory to handle, to exude its fat constituents at the surface, and to become sticky so that if wrapped, it sticks to the wrapper and its surface is marred when the wrapper is removed. These effects are particularly objectionable in chocolate coated confections, inasmuch as the chocolate coating constitutes an outer layer on an edible center and any tendency of the chocolate coating to flow or to adhere to the wrapper often results in an exposure of the center, not only rendering the confection unsightly, but also destroying its original identity as a chocolate coated confection.

It is an object of the present invention to provide an edible chocolate particularly adapted for use as a coating on edible centers, which will retain its initial character even under conditions of summer and tropical heat.

Another object of the invention is to provide an edible chocolate product which will not adhere to the wrapper in hot weather, even though subjected to temperatures as high as 120° F.

A further object of the invention is to provide a chocolate coating for edible centers which will not flow from the centers, will not "oil off" to as great an extent as conventional coatings, and will not "oil off" fat constituents associated with ingredients of the coating that produce stickiness.

Chocolate compositions of the type now under consideration comprise mixtures of chocolate liquor, fat such as cocoa butter, sugar, and frequently milk powder. The chocolate liquor consists of about 52% fat and 48% non-fat solids comprising the fibrous constituent of the chocolate. The cocoa butter is of dry crystalline structure when frozen. It melts at about 92° F. A typical mixture would consist of:

| | Per cent by weight |
|---|---|
| Chocolate liquor | 18 |
| Crystallizable sugar | 60 |
| Cocoa butter | 22 |

As a matter of manufacturing convenience, the liquor, sugar and part of the cocoa butter are mixed together and ground on ordinary roll refiners for the purpose of reducing particle size.

In the conventional process, the ground material is then mixed with the rest of the cocoa butter and worked until all of the solid particles are encased in melted fat. The resulting paste is tempered and cast into cakes which are stored for subsequent use. If the final product is to be a milk chocolate, milk powder may be added in any desired quantity to the above mixture prior to the preliminary mixing.

According to the usual practice in making chocolate coatings, the stored material as above described is prepared for the enrobing operation by remelting and tempering. After enrobing, the mixture sets to solid state when cooled until the fat is crystallized, but reverts to its original fluid condition when subsequently subjected to a temperature which melts the fat.

The fact is known and has been recognized that molded chocolate bars may be made to withstand temperatures above the melting point of the fat by so conducting the mixing as to leave a certain proportion of the surfaces of the sugar and milk particles, if milk powder is used, naked of any fat film, the fat being melted and distributed only over sufficient of the particle surfaces to produce the degree of fluidity necessary for the operation which is to be performed. We believe that when such a mixture first sets, the mass becomes interspersed with a plurality of bonds between the contiguous bare faces of sugar particles, which bonds are formed through reaction with the moisture in the mass. This causes heavy internal friction so that the mass resists deformation even though the fat subsequently becomes melted at high temperatures. Thus molded chocolate bars have been made which will remain set at summer or tropical temperatures. When subjected to these temperatures, some oiling off takes place, but the internal friction is great enough to prevent the surface of the bar from being carried away when the wrapper is removed.

When the composition is to be used for enrobing, the mixture must be much more fluid than a mixture adequate for extrusion into a mold. Plasticity of the mixture is directly proportional to the extent to which the particle surfaces of the ingredients other than fat are coated by melted fat. Therefore, the mixing must be carried much closer to the point at which there will not be enough fat-free surfaces left to build up internal friction when the fat is subsequently melted, and thereby to sustain the coating.

The mixing process is therefore quite critical as many factors may modify the conditions under which it is performed. Therefore, the mixing step alone can not be relied upon to produce a uniform satisfactory enrobed coating which when subsequently heated will not flow off the center, adhere to the wrapper, or "oil off" excessively. The mixing step must therefore be combined with the complementary step of providing the enrobed piece with an autogenously developed continuous sugar skin in a manner presently to be described, which functions to assist in maintaining the initial shape of the coated confection, to reduce exudation of fat at the surface of the coating, and which acts as a screen or filter to prevent the migration to the surface with such fat as does exude, of constituents of the coating which in the presence of fat produce a condition of stickiness.

In providing sufficient fluidity to enable the chocolate to be handled satisfactorily in the enrobing machine, it is possible to create a condition of temporary fluidity by the addition of a small amount of water to the basic composition before mixing, say of the order of 2–3%. When this product is ground on conventional roll refiners some of this water is lost by evaporation, but sufficient remains to preserve a wet surface on the non-fat solid particles. Then, when this product is worked to break it down to paste consistency, the force of working creates unstable fat films on the surfaces of the water-wet particles, giving a temporary fluidity which lasts long enough to permit the desired use or application of the chocolate. Because of the moisture beneath these fat films, however, the films break down subsequently to the enrobing operation, resulting in a "set" product which resists flow.

The addition of water to promote temporary fluidity has the advantage of affording more latitude in the duration of the mixing operation, than when water is not added, since the fluidity is not altogether acquired by the actual rubbing of fat bare surfaces against fat surfaces, so that the mixing may be stopped at a point somewhat remote from the critical point at which the ratio of fat covered to fat bare surfaces is such as to defeat a permanently set coating. However, the process may be carried out without the addition of water under carefully controlled manipulation of the mixing step.

Achievement of these results in practical operation is facilitated by the addition of milk powder, the particles of which provide abundant and irregular surfaces so that the danger of overwetting with fat is minimized and the strength of the set product is increased. For example, skim milk powder can be added to the mixture before the first mixing, but if mixing, grinding and working are not continuous, the addition is preferably withheld until just prior to the final working of the composition to a condition suitable for enrobing. In the latter case, spray dried whole milk powder can also be used.

The following examples are illustrative of procedures that are suitable in the practice of the invention.

A chocolate mix of the following composition is employed:

| | | |
|---|---|---|
| Chocolate liquor (52% fat) | lbs | 14.75 |
| Sugar (sucrose) | lbs | 49.75 |
| Skim milk powder | lbs | 12.25 |
| Cocoa butter | lbs | 23.25 |
| Water | lbs | 2.5 |
| Vanilla beans | oz | 0.5 |

These ingredients are mixed and then ground on roll refiners in the manner customarily practiced in the chocolate industry to a fineness of 0.0014 inch maximum particle size. This refined material is then worked in a melangeur or chaser of the usual construction employed in the chocolate industry just long enough to break the mixture down to a consistency suitable for use in an enrober, at which point there is still a certain multiplicity of fat bare surfaces of the non-fat constituents of the mixture distributed throughout the mix. This mix is then tempered in the usual manner to about 90° F. and used in the enrober to coat edible centers, or the edible centers can be dipped in the chocolate, if desired.

In the event that milk powder is to be added to the ground mix before it is broken down in the melangeur, the ingredients of the above formula, excluding the milk powder, are mixed and ground as described in the previous example, and the ground mixture after cooling is stored until needed. When the chocolate is to be used, the dry mass is first passed through a crusher that reduces it to dry powder form. This dry powder, together with the dry milk powder, is then broken down in a melangeur or chaser to a consistency suitable for enrobing, care being taken to see that working is not carried to the point that the chocolate, sugar and milk particles are completely coated with melted fat. About four minutes working in the melangeur is required to produce the desired consistency, after which the mass is passed to a kettle and brought to 100° F. within approximately 10 minutes. The mass is then pumped to another kettle, where its temperature is reduced to 90° F., and then through an enrober in which candy pieces or candy bars receive a coat of the flowing paste.

It is to be understood that the fat content of the composition must be limited to not more than about 35% in order to avoid wetting too many solid surfaces with melted fat. It will also be understood that the steps of first mixing, grinding and second mixing and working may be interrupted at any convenient point, provided that once the mixture is worked to the consistency desired for enrobing, it should be applied to the center promptly because delay at this point, or freezing and subsequent remelting, causes wetting of additional solid surfaces with fat, so that the final coating does not have the required internal friction to be self-sustaining at high temperatures.

The centers or bars receive a coat of the flowing paste in the enrober. Thus, the first objective of the invention, the coating of the pieces or bars, has been completed without carrying the working of the basic ingredients to the point that the fat has formed a cover around each of the particles of sugar, chocolate solids and milk powder.

At this point the coating of the center is complete, but the low melting fat is still present, and on subjection to high temperatures, this fat would melt causing "oiling off" on the surface, so that if the process were to stop here, the liquefied fat exuding to the surface would bring with it in suspension, particles of the non-fat constituents of the coating which would form a sticky mass in the presence of the fat. Moreover, the strength of the coating at this point in the process is substantially less than that of the prior art molded bars mentioned hereinbefore, due to the fact that the mixture must be worked to a more fluid condition to permit enrobing, and in consequence, the coating has fewer fat bare bonds.

Hence, the adherence of the sticky surface to the wrapper would cause the chocolate coating to be carried away with the wrapper to a varying extent, marring the surface of the product and in some cases tearing portions of the coating entirely off the edible center.

This brings us to the complementary phase of our invention, i. e., the provision of a continuous sugar skin about the surface of the coating, derived from the coating. This sugar skin effectively keeps the wrapper from contacting the underlying chocolate mass, and being derived from the coating itself the crystalline structure of the inner surface of this skin extends into the surface of the coating and interlocks closely with the microscopically rough surface of the solid materials and fat of the coating. Thus there is no plane of the separation between the inner face of the sugar skin and the adjacent surface of the coating; the sugar skin is rooted in the coating. The firm interlocked relation of the sugar skin to the surface of the coating prevents the sugar skin from chipping off or becoming detached. Moreover, while some of the fat may melt under the skin, and some of it reach the surface, by exuding between crystalline interfaces of the sugar skin structure, the texture of the skin is such that the solids particles which cause stickiness are filtered, that is, held back and do not reach the surface so that the coating does not adhere to the wrapper, with the result that there is no damage to the surface of the product when the wrapper is removed.

The sugar skin is autogenously produced by applying moisture to the surface of the coating, which is adsorbed on the surfaces of the coating and dissolves some of the sugar to form a sugar syrup film from which the water evaporates to cause the formation of a continuous skin of crystallized sugar over the chocolate.

The moisture may be applied either while the chocolate, after tempering, is still plastic, or after it has frozen or set. The moisture dissolves the fat bare sugar crystals appearing in the surface, not only at their exposed surfaces but substantially throughout their depthwise extent, the sugar solution spreading over the entire surface and, upon recrystallization through evaporation, producing a continuous integral skin of sugar crystals uniformly interlocked in a surface direction and interlocked with the structure of the coating depthwise. There is an advantage in applying the moisture to the coating while the latter is hot and plastic, for cooling of the coating accelerates the evaporation of the moisture, and crystallization of the sugar syrup proceeds substantially simultaneously with crystallization of the contiguous fat particles, producing an interlock between the sugar crystals of the skin and the fat crystals of the chocolate.

The moisture can be applied in any desired manner, such as by dipping the enrobed product in a water bath or subjecting the enrobed product to a mist or spray of water while the pieces are either stationary or moving.

Preferably, the pieces after having been coated, are subjected to an atmosphere substantially saturated with moisture. If the conditions are such that the temperature of the coating falls below that of the saturated atmosphere at any instant during its exposure to the atmosphere, moisture will then be condensed on the surface of the coating, resulting in a heavier skin than would be obtained by simple adsorption of moisture on the coating. However, a coating of the type described above when set may have enough internal friction and resulting strength that a lighter skin such as obtained by simple adsorption is sufficient to provide a commercially satisfactory product. The application of moisture can be accomplished advantageously by carrying the chocolate products on a conveyor through, or by letting the chocolate products remain stationary in, a chamber or tunnel in which the moisture is either adsorbed or condensed on the products, after which they are carried on to the usual cooling tunnel in which the sugar syrup film is dried by evaporation.

For example, in the usual enrobing operation, the centers are carried past the enrobing apparatus on a mesh conveyor, and are then transferred to another conveyor or belt having a continuous flat, smooth surface of the character commonly employed in the chocolate industry to carry the enrobed products through the cooling apparatus without deleterious sticking to the conveyor. It is convenient to apply the moisture while the products are supported on this second conveyor but before they reach the cooling apparatus, but in this case the moisture so applied will not reach the bottoms of the articles. Hence, the bottoms should be moistened by deposition or spraying before they are picked up by the second conveyor, or the latter should be wet with water before it receives the chocolate products as by passing it through a water bath or applying water to it by means of a spray or wiper.

The atmosphere in the chamber or tunnel can be humidified in any desired manner before it is supplied thereto, or steam or moisture can be injected into the chamber or tunnel itself, care being taken in the latter case to prevent actual dripping of water onto the product. The controlling factors in this operation are the temperature and relative humidity of the atmosphere, the length of time that the product is subjected to this atmosphere, and the volume of air circulated through the chamber. Assuming high relative humidity (say 90% to 95%), the desired amount of moisture can be applied to the chocolate most rapidly if the temperature of the atmosphere and its dew point are slightly above the temperature of the chocolate composition.

By way of example, the coated products may be placed on a stationary mesh support located in and above the floor of a chamber in which the air is maintained substantially saturated with moisture at a temperature of about 98° F. for two to seven minutes. The products are then placed in a suitable cooling chamber or tunnel in which the cocoa butter is frozen and the skin formed as described above. During cooling the products may be supported on the usual chocolate dipping paper which appears to absorb the moisture from the film and then to permit its evaporation to the surrounding atmosphere. However, high temperatures tend to cause discoloration of the chocolate and it is, therefore, preferable to maintain the temperature of the atmosphere as little above that of the coating as is necessary to obtain a sufficient skin. Thus in the usual enrobing operation referred to above, the relatively thin coating of chocolate is applied at about 90° F. to the larger and cooler edible center and the products then conveyed to the point of application of the moisture. Under these conditions good results have been obtained with an atmosphere at 84° F., the relative humidity being maintained at about 96% and the time of exposure of the product thereto being approximately two minutes.

Lower temperature and/or lower relative humidity are usually undesirable from the practical standpoint because the time required to obtain adsorption of the desired amount of moisture is increased. However, such conditions are not excluded, particularly where the air is circulated through the chamber so that a fresh supply of moist air is continuously maintained over the surface of the chocolate. Circulation of air also aids in preventing dripping of water on the chocolate which may occur when steam or water is injected into the chamber.

A solidified chocolate coating produced in accordance with our invention has an internal structure consisting of a sufficiency of distributed fat bare surfaces of the chocolate, sugar and milk powder particles, if milk powder is employed, to form bonds which give shape-sustaining stability to the mass when the fat is in molten condition. It has on its surface a continuous, uniform skin of sugar crystals interlocked with each other and with other solid particles of the underlying main body of chocolate which will not become flowable at temperatures above the melting point of the cocoa butter and will maintain its shape at temperatures as high as 120° F. The crystal interlock of the skin and the underlying chocolate layer effectively integrates and binds the skin and the chocolate layer so that the skin section is effectively maintained against flaking off. The firmly bonded skin section itself, not only provides a shell which serves as a structural framework assisting in maintaining the initial shape of the coated confection, but also provides a seal which serves to reduce exudation of the fat constituents at the surface of the product and to prevent the constituents which produce stickiness reaching the surface with such fat that does exude. Such a coating, even though subjected to temperatures as high as 120° F., will not become sticky at the surface and will not adhere to the wrapper in which the product may be placed for purposes of transportation, sanitation and marketing.

Under conditions of high humidity, such as are prevalent in tropical climates, the surface of the sugar skin may dissolve, and upon recrystallization, adhere to the wrapper. The integration of the sugar crystals throughout the surface extent of the coating produces a cohesion which is greater than the adhesion of the sugar skin to the wrapper, so that the latter peels off, leaving the sugar skin intact. This distinguishes from ordinary chocolate coated products which sometimes naturally acquire a "sugar bloom." This forms as isolated patches and not as an intact continuous skin of interlocked crystals throughout. Consequently, under conditions of high humidity, as described, a patch of the sugar bloom may adhere to the wrapper and come off with the wrapper when it is attempted to remove the latter, carrying with it a portion of the underlying coating.

It will be understood that while the sugar skin is particularly advantageous in combination with an enrobed coating in a product intended for use under tropical and like conditions, as described in detail above, yet the skin itself is desirable in other cases. For example, it may be applied to the molded bars mentioned above to reduce "oiling off" at the surface, or formed on any conventional chocolate or chocolate-coated product for the purposes of diminishing "oiling off" or preventing adherence of the product to the wrapper.

It is to be understood that the scope of the invention is not intended to be limited to the specific procedures, proportions of ingredients, and other particulars which have been set forth above, which have been given by way of illustrating the principle of the invention. For a definition of the scope of the invention, reference is made to the appended claims.

What is claimed is:

1. In a process of making a solidified sweetened chocolate which is non-sticky at temperatures above the melting point of the cocoa butter from a hot plastic chocolate mix including crystallizable sugar, the steps of forming the plastic mix into the desired shape, then applying moisture to the surface of the mix while still in a hot plastic state to cause some of the sugar in the mix to dissolve in the moisture and form a sugar syrup film on the surface, and then drying the film and cooling to solidify the mix with a thin skin of crystalline sugar bonded to its surface.

2. In a process of making a solidified sweetened chocolate which is non-sticky at temperatures above the melting point of the cocoa butter from a hot flowable chocolate mix including crystallizable sugar, the steps of working the mix to reduce it to a flowable consistency, forming the flowable mixture into the desired shape, applying moisture to the surface of the mix while still plastic to cause some of the sugar in the mix to dissolve in the moisture and form a sugar syrup film on the surface, and then simultaneously drying the film and cooling the shaped mix to crystallize the sugar in said film and the crystallizable constituents of the mix, whereby a thin skin of crystallized sugar is formed on the surface of the mix interlocked with the crystalline structure thereof.

3. In a process of making a solidified sweetened chocolate from a hot plastic chocolate mix containing crystallizable sugar and which upon setting is non-sticky at temperatures above the melting point of the cocoa butter, the steps of forming the plastic mix into the desired shape, subjecting the formed mix while still plastic to air of relatively high humidity having a dew point higher than the temperature of the mix to deposit moisture on the surface of the mix and cause some of the sugar in the mix to dissolve in the moisture and form a sugar syrup film on the surface, and then drying the film and cooling to solidify the mix and form a crystalline skin of sugar thereon.

4. In a process of making a chocolate coated edible product, the steps of forming a mixture of chocolate, cocoa butter, and crystallizable sugar, working the mixture to a flowable consistency but discontinuing the working while a substantial proportion of the solid particles of the mix are still uncoated with fat, whereby the mix upon subsequent setting becomes self-sustaining at temperatures above the melting point of the cocoa butter due to the development of bonds between the fat bare surfaces of solids of the mix, applying the flowable mix as a coating on an edible center, then applying moisture to the surface of the coating to cause some of the sugar in the coating to dissolve in the moisture and form a sugar syrup film on the surface, and then drying the film to form a thin skin of crystalline sugar on and penetrating the surface of the coating.

5. In a process of making a chocolate coated edible product, the steps of forming a mixture of chocolate, cocoa butter, crystallizable sugar, and a small proportion of water, the total fat content of the mixture being not greater than about 35%, grinding the mixture, working the mixture until it reaches a temporary flowability enabling its use as a coating but on subsequent setting becomes self-sustaining at temperatures above the melting point of the cocoa butter, then discontinuing the working, applying the flowable mix as a coating on an edible center, then applying moisture to the surface of the coating to cause some of the sugar in the coating to dissolve in the moisture and form a sugar syrup film on the surface, and then drying the film to form a thin skin of crystalline sugar bonded to the surface of the coating.

6. In a process of making a chocolate coated edible product, the steps of forming a mixture of chocolate, cocoa butter, crystallizable sugar and a small proportion of water, grinding the mixture, adding milk solids, the total fat content of the resulting mixture being not greater than about 35%, working the mixture until it reaches a temporary flowability enabling its use as a coating but on subsequent setting becomes self-sustaining at temperatures above the melting point of the cocoa butter, then discontinuing the working, applying the flowable mix as a coating on an edible center, subjecting the coated product while the coating is still at a temperature of about 90° F. to an atmosphere at a temperature of about 84° F. and relative humidity of about 96% for approximately two minutes to adsorb moisture on the surface of the coating and cause some of the sugar in the coating to dissolve in the adsorbed moisture and form a sugar syrup film on the surface, and then drying the film and cooling to solidify the coating and form a crystalline skin of sugar bonded thereto.

7. A solidified sweetened chocolate which will remain free from surface stickiness at temperatures above the melting point of the cocoa butter constituent thereof, comprising a solidified sweetened chocolate mix underlying a crystalline sugar skin, with the sugar crystals of the skin interlocked with each other and with the underlying chocolate mix, the interlock of the sugar skin crystals being sufficiently close to hold back the non-fat solids particles of the mix flowing surfaceward with fluid fat in the action of oiling off.

8. A solidified sweetened chocolate which will remain free from surface stickiness at temperatures above the melting point of the cocoa butter constituent thereof, comprising a solidified sweetened chocolate mix in which a sufficient proportion of non-fat particles of the mix are fat bare, and interbonded so as to give shape stability to the solidified mix when heated above the melting point of the fat constituent, said mix underlying a crystalline sugar skin, with the sugar crystals of the skin interlocked with each other and with the fat and non-fat particles of the underlying chocolate mix.

9. A solidified sweetened chocolate which will remain free from surface stickiness at temperatures above the melting point of the cocoa butter constituent thereof, comprising a solidified sweetened chocolate mix underlying a crystalline sugar skin, with the sugar crystals of the skin interlocked with each other and with the underlying chocolate mix.

NORMAN W. KEMPF.
HAROLD H. HOBEN.

REFERENCES CITED

The following references are of record in the file of this patent:

UNITED STATES PATENTS

| Number | Name | Date |
| --- | --- | --- |
| 479,581 | Achor | July 26, 1892 |
| 1,043,839 | Hunter | Nov. 12, 1912 |
| 1,044,758 | Dierbach | Nov. 19, 1912 |
| 2,201,820 | Zizinia | May 21, 1940 |

FOREIGN PATENTS

| Number | Country | Date |
| --- | --- | --- |
| 515,430 | Great Britain | 1939 |